US008725309B2

(12) United States Patent
Kubotani et al.

(10) Patent No.: US 8,725,309 B2
(45) Date of Patent: May 13, 2014

(54) SAFETY DRIVING SUPPORT APPARATUS

(75) Inventors: Hiroyuki Kubotani, Kanagawa (JP); Kazuhiko Iwai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 802 days.

(21) Appl. No.: 12/593,941

(22) PCT Filed: Mar. 31, 2008

(86) PCT No.: PCT/JP2008/000834
§ 371 (c)(1),
(2), (4) Date: Sep. 30, 2009

(87) PCT Pub. No.: WO2008/126389
PCT Pub. Date: Oct. 23, 2008

(65) Prior Publication Data
US 2010/0076621 A1 Mar. 25, 2010

(30) Foreign Application Priority Data
Apr. 2, 2007 (JP) ................................ P2007-096609

(51) Int. Cl.
*G08G 1/16* (2006.01)
(52) U.S. Cl.
USPC .............................................. 701/1; 340/901
(58) Field of Classification Search
USPC ................. 701/1, 301, 96, 93, 116, 117, 119;
340/901, 902, 904, 905, 907, 909, 916,
340/426.16
See application file for complete search history.

(56) References Cited

U.S. PATENT DOCUMENTS

| 7,194,347 | B2 * | 3/2007 | Harumoto et al. | 701/45 |
| 7,853,051 | B2 * | 12/2010 | Ota | 382/118 |
| 7,932,819 | B2 * | 4/2011 | Arie et al. | 340/461 |

FOREIGN PATENT DOCUMENTS

| JP | 2004-149035 A | 5/2004 |
| JP | 2005-147884 A | 6/2005 |
| JP | 2005-165555 A | 6/2005 |
| JP | 2006-146429 A | 6/2006 |
| JP | 2006-163828 A | 6/2006 |

OTHER PUBLICATIONS

International Search Report for PCT/JP2008/000834.

* cited by examiner

*Primary Examiner* — Dalena Tran
(74) *Attorney, Agent, or Firm* — Pearne & Gordon LLP

(57) ABSTRACT

An object of the invention is to provide a safety driving support apparatus capable of detecting a dangerous moving object with high accuracy at quick timing. A safety driving support apparatus 100 of the invention includes a traffic obstacle detection section 101 for detecting a traffic obstacle of the periphery of a vehicle, a speed change induced event detection section 106 for detecting an event of inducing a sudden change in behavior of a pedestrian from a traffic obstacle detected by the traffic obstacle detection section 101, a speed change detection section 102 for detecting a sudden change in behavior of a pedestrian from a traffic obstacle detected by the traffic obstacle detection section 101, and a dangerous pedestrian detection section 109 for deciding that the pedestrian is a dangerous pedestrian when the speed change detection section 102 detects a change in behavior of a pedestrian within a certain time from a point in time when a speed change induced event of a pedestrian detected by the speed change induced event detection section 106 occurs.

9 Claims, 9 Drawing Sheets

SAFETY DRIVING SUPPORT APPARATUS

TECHNICAL FIELD

The present invention relates to a driving support technical field for supporting safety confirmation of a driver who drives a vehicle.

BACKGROUND ART

A conventional safety driving support apparatus includes a section for estimating a danger region from map information, a path of a danger object and a path of one's vehicle in a place intersecting or approaching the danger object and a display section for displaying the estimated danger region and the danger object with the danger region and the danger object superimposed on a map of the intersecting or approaching place. According to this safety driving support apparatus, there are effects capable of displaying an object and a region having a possibility that an accident related to one's vehicle occurs even at an intersection etc. at which an accident does not occur and previously making a driver conscious of danger (for example, see Patent Reference 1).

Patent Reference 1: JP-A-2005-165555

DISCLOSURE OF THE INVENTION

Problems that the Invention is to Solve

However, the conventional safety driving support apparatus decides a pedestrian as in danger although actually the pedestrian is in no danger, for example, when the pedestrian stops according to a traffic signal because an intersection having the traffic signal is displayed as a danger region and the pedestrian is displayed as a danger object uniformly.

With respect to this conventional technique, a technique for deciding that a pedestrian is in danger when a change in speed of the pedestrian is detected and the change in speed of the pedestrian occurs is provided.

However, in this technique, it is decided that a pedestrian is in danger without distinction even in a dangerous situation in which the pedestrian suddenly starts running at the point of a change in a signal at an intersection and crosses a crosswalk and even in a situation with no danger in which the pedestrian simply starts running a sidewalk without intention of crossing at a crosswalk.

Also, as a technique for directly determining that it is in danger, there is the technique for determining that a pedestrian is in danger by detecting that the pedestrian enters the future movement path of one's vehicle. However, in this technique, it is determined that the pedestrian is in danger first at a point in time when the pedestrian enters the movement path of one's vehicle, so that a danger warning to a driver is given just previously.

The invention has been implemented in view of the conventional circumstances described above, and an object of the invention is to provide a safety driving support apparatus capable of detecting a dangerous moving object with high accuracy at quick timing.

Means for Solving the Problems

A safety driving support apparatus of the invention is adapted to comprises:

a traffic obstacle detection section that detects a moving object including a vehicle or a pedestrian present in a periphery of one's vehicle, the moving object and a traffic regulation substance, or the moving object and a road shape;

a speed change induced event detection section that detects a speed change induced event which is defined as an event of inducing a change in speed of the moving object on the basis of a detection result of the traffic obstacle detection section;

a speed change detection section that detects the change in speed of the moving object on the basis of the detection result of the traffic obstacle detection section; and a dangerous moving object detection section that determines the moving object as a dangerous moving object when the speed change induced event detection section detects occurrence of the speed change induced event at present or in the past and the speed change detection section detects the change in speed of the moving object.

By this configuration, a dangerous moving object with a high possibility of leading to an accident since a speed is suddenly changed against driver's expectation, for example, a pedestrian who suddenly starts to run when a signal changes from blue to red at an intersection can be detected with high accuracy. Also, for example, the dangerous moving object can be detected at timing quicker than the conventional case of detecting that a pedestrian enters a path of one's vehicle. Therefore, a driver can properly grasp presence of the dangerous moving object to be particularly noted according to a situation of the periphery of one's vehicle, so that occurrence of an accident can be prevented.

Advantage of the Invention

The invention can provide a safety driving support apparatus having an effect capable of detecting a dangerous moving object with high accuracy at quick timing.

DESCRIPTION OF REFERENCE NUMERALS AND SIGNS

Figure 1:
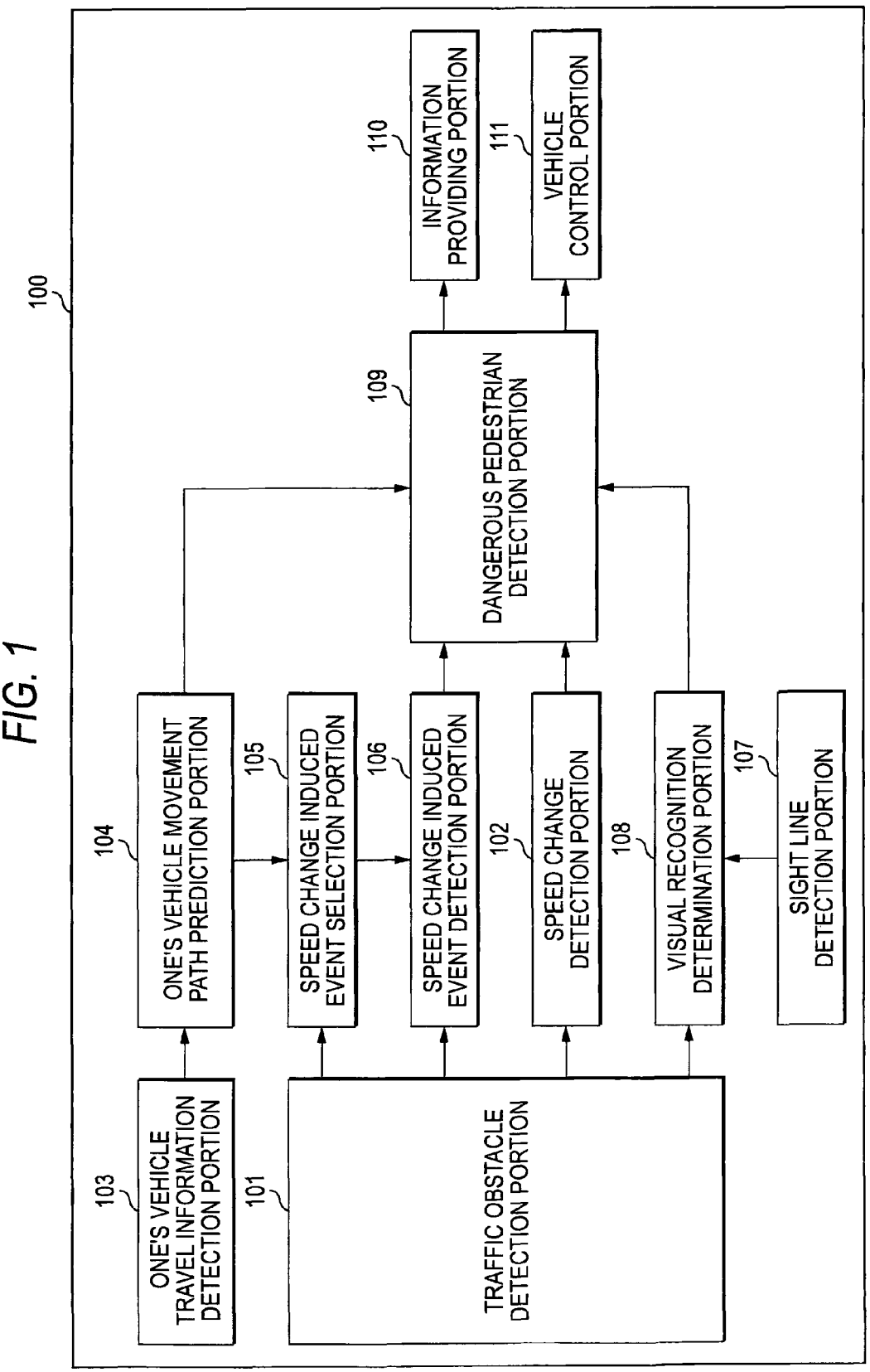
FIG. 1 is a block diagram of a safety driving support apparatus according to a first embodiment of the invention.

100 SAFETY DRIVING SUPPORT APPARATUS
101 TRAFFIC OBSTACLE DETECTION PORTION
102 SPEED CHANGE DETECTION PORTION

103 ONE'S VEHICLE TRAVEL INFORMATION DETECTION PORTION
104 ONE'S VEHICLE MOVEMENT PATH PREDICTION PORTION
105 SPEED CHANGE INDUCED EVENT SELECTION PORTION
106 SPEED CHANGE INDUCED EVENT DETECTION PORTION
107 SIGHT LINE DETECTION PORTION
108 VISUAL RECOGNITION DETERMINATION PORTION
109 DANGEROUS PEDESTRIAN DETECTION PORTION
110 INFORMATION PRESENTATION PORTION
111 VEHICLE CONTROL PORTION

BEST MODE FOR CARRYING OUT THE INVENTION

A safety driving support apparatus of the invention is configured to comprise:

a traffic obstacle detection section that detects a moving object including a vehicle or a pedestrian present in a periphery of one's vehicle, the moving object and a traffic regulation substance, or the moving object and a road shape;

a speed change induced event detection section that detects a speed change induced event which is defined as an event of inducing a change in speed of the moving object on the basis of a detection result of the traffic obstacle detection section;

a speed change detection section that detects the change in speed of the moving object on the basis of the detection result of the traffic obstacle detection section; and a dangerous moving object detection section that determines the moving object as a dangerous moving object when the speed change induced event detection section detects occurrence of the speed change induced event at present or in the past and the speed change detection section detects the change in speed of the moving object.

By this configuration, a dangerous moving object with a high possibility of leading to an accident since a speed is suddenly changed against driver's expectation, for example, a pedestrian who suddenly starts to run when a signal changes from blue to red at an intersection can be detected with high accuracy. Also, for example, the dangerous moving object can be detected at timing quicker than the conventional case of detecting that a pedestrian enters a path of one's vehicle. Therefore, a driver can properly grasp presence of the dangerous moving object to be particularly noted according to a situation of the periphery of one's vehicle, so that occurrence of an accident can be prevented.

Also, in the safety driving support apparatus of the invention, the traffic obstacle detection section detects a position or a shape feature of the traffic regulation substance, a position or a shape feature of the road shape, or a movement state, a position or a shape feature of the moving object present in the periphery of one's vehicle. The safety driving support apparatus further comprises a speed change induced event selection section that selects the speed change induced event to be detected by the speed change induced event detection section on the basis of information detected by the traffic obstacle detection section.

By this configuration, an event with a high possibility of inducing a change in speed of a moving object such as a pedestrian can be selected based on a situation of an attribute etc. such as age guessed from a shape feature of a height etc. of the pedestrian, a position or a movement state of the pedestrian, a road shape or traffic regulation, so that a dangerous moving object can be determined with higher accuracy.

Also, the safety driving support apparatus of the invention is configured to comprise a one's vehicle movement path prediction section that predicts a path of one's vehicle. The speed change induced event selection section selects the speed change induced event to be detected within a range determined on the basis of a path of one's vehicle predicted by the one's vehicle movement path prediction section. Also, the safety driving support apparatus of the invention is configured to comprise a one's vehicle travel information detection section that detects travel information about one's vehicle. The one's vehicle movement path prediction section predicts the path of one's vehicle from the travel information about one's vehicle detected by the one's vehicle travel information detection section.

By this configuration, an event with a high possibility of inducing a change in speed of a moving object such as a pedestrian can be selected more properly according to a movement path of one's vehicle.

Also, in the safety driving support apparatus of the invention, the speed change induced event detection section detects occurrence of the speed change induced event within a range determined in correspondence with the speed change induced event selected by the speed change induced event selection section.

By this configuration, the range of detecting the speed change induced event can be limited, so that a processing load can be reduced.

Also, in the safety driving support apparatus of the invention, the speed change detection section sets a moving object present within a range determined in correspondence with the speed change induced event selected by the speed change induced event selection section as a detection object.

By this configuration, a moving object of an object to detect the change in speed can be limited, so that a processing load can be reduced.

Also, the safety driving support apparatus of the invention is configured to comprise a sight line detection section that detects a sight line direction of a driver, and a visual recognition determination section that determines whether the driver visually recognizes the moving object on the basis of the sight line direction detected by the sight line detection section and a presence position of the moving object detected by the traffic obstacle detection section. The dangerous moving object detection section determines the moving object as a dangerous moving object when the speed change detection section detects the change in speed of the moving object which is determined that the moving object is visually recognized within the past predetermined time by the visual recognition determination section.

By this configuration, by determining whether the driver recognizes the moving object, a decision near to danger prediction of the driver can be made, so that safety driving of the driver can be supported more properly.

Also, the safety driving support apparatus of the invention is configured to comprise a storage section that stores information indicating the speed change induced event in relation to information about the traffic regulation substance, the road shape or the moving object. The speed change induced event selection section selects the speed change induced event to be detected by the speed change induced event detection section from the information stored in the storage section.

By this configuration, an event with a high possibility of inducing a change in speed in a condition of a traffic regulation substance etc. of the periphery of one's vehicle can be selected, so that a dangerous moving object can be determined with higher accuracy.

Also, the safety driving support apparatus of the invention is configured to comprise an acquisition section that acquires information indicating the speed change induced event from a roadside system installed in a road through a road-to-vehicle communication section. The speed change induced event selection section selects the speed change induced event to be detected by the speed change induced event detection section from the information acquired by the acquisition section.

By this configuration, information indicating an event with a high possibility of inducing a change in speed in a place in which a roadside system is installed can be acquired efficiently.

Also, the safety driving support apparatus of the invention is configured to comprise a information providing section that provides information about avoidance of contact with the dangerous moving object to a driver when the dangerous moving object is detected by the dangerous moving object detection section.

By this configuration, a driver can be notified of presence of a dangerous moving object by a display, a speaker, etc., so that recognition of the dangerous moving object by the driver can be helped.

Further, the safety driving support apparatus of the invention is configured to comprise a vehicle control section that controls a vehicle for avoidance of contact with the dangerous moving object when the dangerous moving object is detected by the dangerous moving object detection section.

By this configuration, notification of presence of a dangerous pedestrian can be provided by application through a headlight or a vehicle can be braked automatically, so that avoidance behavior or recognition of a dangerous moving object by a driver can be helped.

An embodiment of the invention will hereinafter be described with reference to the drawings.

(First Embodiment)

FIG. 1 is a block diagram representing a configuration of a safety driving support apparatus according to a first embodiment of the invention.

As shown in FIG. 1, a safety driving support apparatus 100 includes a traffic obstacle detection portion 101 and a speed change detection portion 102 for detecting a change in speed from a movement state of the pedestrian detected by the traffic obstacle detection portion 101. The traffic obstacle detection portion 101 is constructed of a sensing unit such as a millimeter-wave radar, a laser radar installed in a front bumper or a stereo camera turned in an advance direction and installed in the back of a room mirror, a storage unit for storing map information included in a car navigation system, and a communication unit such as a road-to-vehicle communication unit (not shown) such as a radio beacon, an optical beacon and DSRC (Dedicated Short Range Communication), and detects a moving object including a pedestrian and a vehicle, a road shape including an intersection, a traffic regulation substance including a sign, marking and a traffic signal present in the front of one's vehicle and makes an estimation of a position (a distance or an angle viewed from one's vehicle), a determination of a shape feature and a determination of a kind of the traffic regulation substance etc. detected and detects a traffic obstacle defined as a movement state such as speed and their determination results.

Also, the safety driving support apparatus 100 includes a one's vehicle travel information detection portion 103 and a one's vehicle movement path prediction portion 104. The one's vehicle travel information detection portion 103 detects travel information such as one's vehicle speed, steering angle, winker indication, position information, road shape or route information to a destination from an ECU (engine control unit) mounted in one's vehicle, a car navigation system, a vehicle-mounted network such as a CAN (Controller Area Network), a GPS (Global Positioning System), etc. The one's vehicle movement path prediction portion 104 predicts the future movement path of one's vehicle from the travel information about one's vehicle detected by the one's vehicle travel information detection portion 103.

Also, the safety driving support apparatus 100 includes a speed change induced event selection portion 105 and a speed change induced event detection portion 106. The speed change induced event selection portion 105 selects at least one or more speed change induced event which is an event with a high possibility of inducing a change in speed of a pedestrian in the periphery of one's vehicle within a range determined based on a predicted movement path of one's vehicle predicted by the one's vehicle movement path prediction portion 104, a movement state, a shape feature, position information about a moving object including a pedestrian, a road shape, a traffic regulation substance of the periphery of one's vehicle detected by the traffic obstacle detection portion 101. The speed change induced event detection portion 106 detects occurrence of a speed change induced event within a range prescribed in correspondence with the speed change induced event selected by the speed change induced event selection portion 105.

Also, the safety driving support apparatus 100 includes a sight line detection portion 107 and a visual recognition determination portion 108. The sight line detection portion 107 has a camera etc. for photographing the periphery of a face including eyes of a driver and being mounted in a room minor, the inside of an instrument panel, a column cover of the inside of one's vehicle, etc. and detects a sight line direction of the driver. The visual recognition determination portion 108 determines whether a driver visually recognizes the pedestrian from the sight line direction detected by the sight line detection portion 107 and a presence position of the pedestrian detected by the traffic obstacle detection portion 101.

Also, the safety driving support apparatus 100 includes a dangerous pedestrian detection portion 109 which predicts a movement path of a pedestrian based on a movement state in the case where a driver visually recognized the pedestrian in the past and deciding that the possibility that a change in speed of the pedestrian is beyond expectation for the driver is high and the pedestrian is a dangerous pedestrian when a speed change induced event is detected by the speed change induced event detection portion 106 and the change in speed of the pedestrian is detected by the speed change detection portion 102 and the pedestrian is visually recognized within the past certain time by the visual recognition determination portion 108.

Further, the safety driving support apparatus 100 includes an information providing portion 110 and a vehicle control portion 111. The information providing portion 110 provides information about avoidance of contact with the dangerous pedestrian to a driver using a display, a speaker, etc. when the dangerous pedestrian is detected by the dangerous pedestrian detection portion 109. The vehicle control portion 111 performs vehicle control of, for example, applying a headlight in a direction of the dangerous pedestrian or automatically braking one's vehicle for avoidance of contact with the dangerous pedestrian when the dangerous pedestrian is detected by the dangerous pedestrian detection portion 109.

Here, the traffic obstacle detection portion 101 is one example of a traffic obstacle detection section. Also, the speed change detection portion 102 is one example of a speed change detection section. Also, the one's vehicle travel information detection portion 103 is one example of a one's vehicle travel information detection section. Also, the one's vehicle movement path prediction portion 104 is one example of a one's vehicle movement path prediction section. Also, the speed change induced event selection portion 105 is one example of a speed change induced event selection section.

Also, the speed change induced event detection portion 106 is one example of a speed change induced event detection section. Also, the sight line detection portion 107 is one example of a sight line detection section. Also, the visual recognition determination portion 108 is one example of a visual recognition determination section. Also, the dangerous pedestrian detection portion 109 is one example of a dangerous pedestrian detection section. Also, the information providing portion 110 is one example of an information providing section. Also, the vehicle control portion 111 is one example of a vehicle control section.

Also, information indicating a speed change induced event is an event of inducing an accident resulting from a sudden change in speed of a pedestrian among pedestrian accidents actually occurring in the past, and is information in which an accident with high frequency of occurrence is associated with position information about a moving object, a traffic regulation substance, and a road shape of the periphery of a vehicle, etc. As an example of the speed change induced event, the case of the point of a change in a signal for pedestrian installed on a road of the right-turn direction, the case where a bus stop is present in a lane opposite to a road on which one's vehicle travels in the near future and a route bus stops at the bus stop under a situation in which a pedestrian is present on a sidewalk of a lane of the one's vehicle side, the case where a bus approaches a bus stop within a certain distance, the case where a puddle or a construction area is present on a lane of the one's vehicle side or a sidewalk and a pedestrian approaches the puddle or the construction area under a situation in which the pedestrian is present on a sidewalk of the lane of the one's vehicle side within a certain distance (for example, 5 m or less), the case where under a situation in which one infant is present on a sidewalk of a lane of the one's vehicle side, an adult is not present within 3 m around the infant and an adult is present on a sidewalk of the opposite lane, the case where a ball and a child are present on a sidewalk of a lane of the one's vehicle side (a distance between the ball and the child is, for example, 5 m or less), etc. are considered.

As a method for acquiring a speed change induced event of the safety driving support apparatus 100, the speed change induced event may be stored in the safety driving support apparatus 100 in a form of being accumulated together with map information in a car navigation system previously or may be acquired from a roadside system installed in a road by, for example, a road-to-vehicle communication section (not shown) such as a radio beacon, an optical beacon and DSRC. In the case of being acquired from the roadside system, by individually preparing speed change induced events frequently occurring every place in which the roadside system is installed, the speed change induced events can be acquired efficiently.

In addition, in the above explanation, the example of determining a dangerous pedestrian using a state of visually recognizing the dangerous pedestrian by the sight line detection portion 107 and the visual recognition determination portion 108 is shown, but it goes without saying that a dangerous pedestrian may be determined without using a state in which a driver recognizes a pedestrian. Also, the speed change induced event selection portion 105 described above is not an essential configuration, but a dangerous pedestrian can be determined more properly according to a situation of the periphery of one's vehicle by including the speed change induced event selection portion 105.

Figure 2:
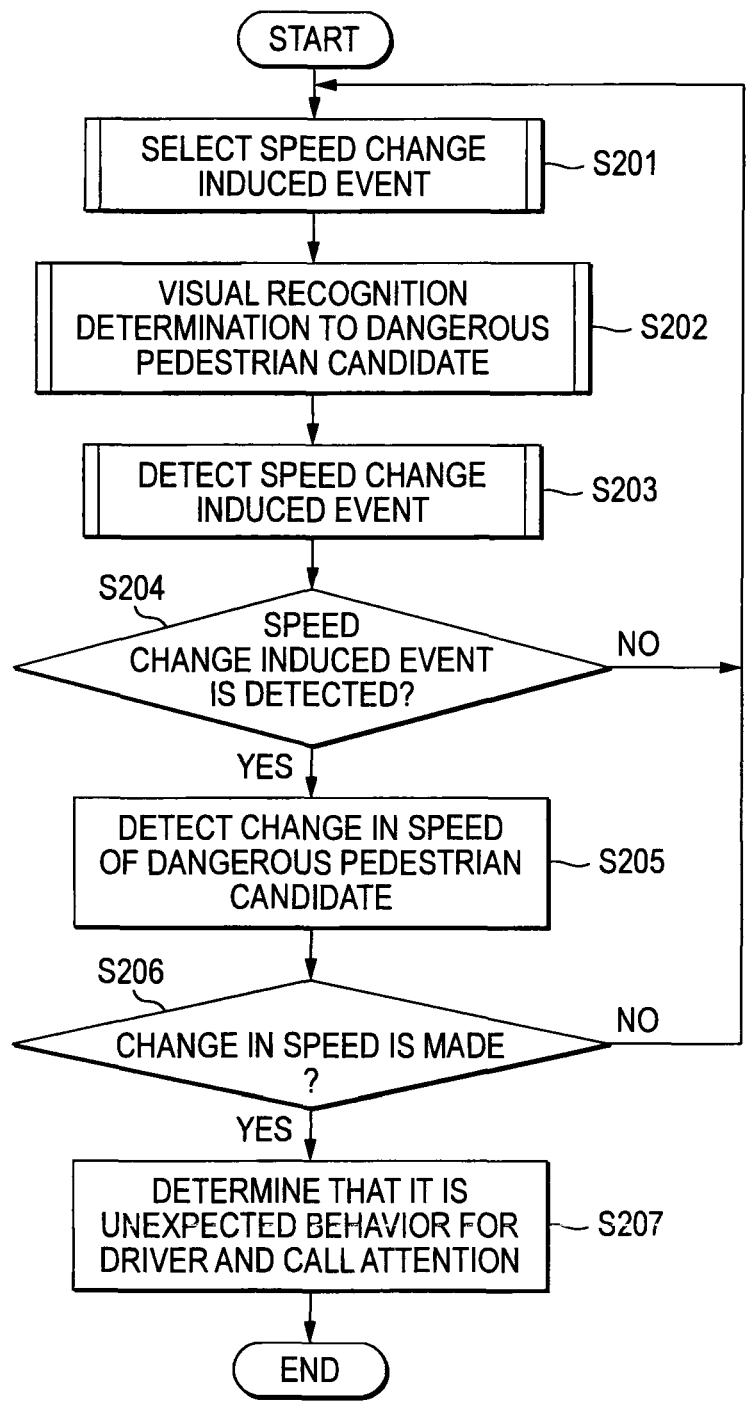
FIG. 2 is a flow diagram representing an operation of the safety driving support apparatus according to the first embodiment of the invention.
Figure 5:
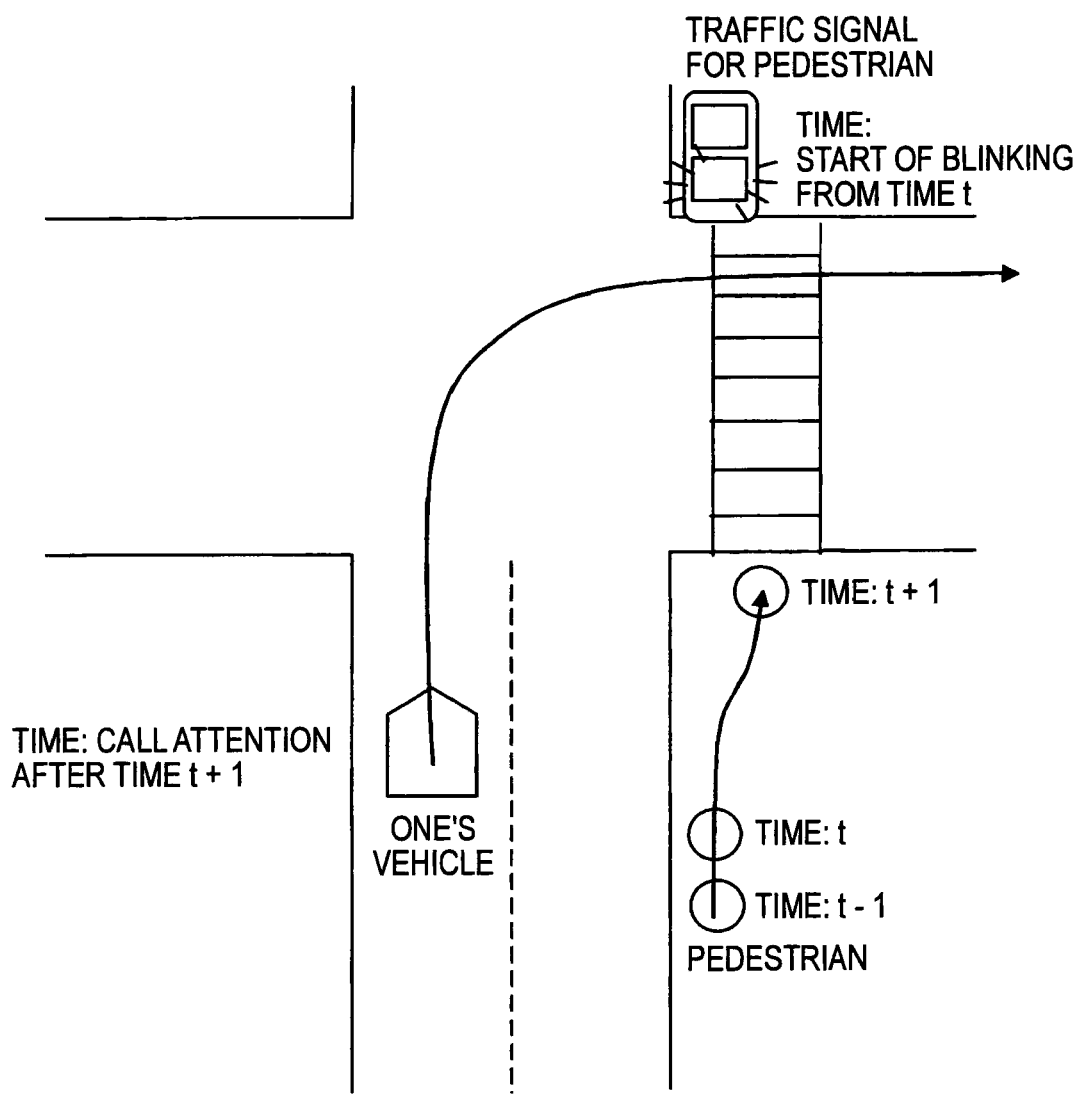
FIG. 5 is a diagram representing a situation of a pedestrian who suddenly accelerates and crosses a crosswalk at the point of a change in a signal.

Next, FIG. 2 shows a flow diagram representing an operation of the safety driving support apparatus according to the first embodiment of the invention. An operation flow of the safety driving support apparatus will herein be described by taking the case where a pedestrian backward passing through a sidewalk of the opposite lane suddenly accelerates and crosses a crosswalk installed in a road of the right-turn direction at the point (blue blinking) of a change in a signal for pedestrian when one's vehicle as shown in FIG. 5 turns right at an intersection as an example.

The safety driving support apparatus 100 detects the presence or absence of a pedestrian, a vehicle, a crosswalk, a traffic signal, a road shape of the periphery of one's vehicle, and a direction and a distance to an object in the case of the presence, detected by the traffic obstacle detection portion 101, and selects a speed change induced event by the speed change induced event selection portion 105 (S201).

Here, as a method in which the traffic obstacle detection portion 101 detects a road shape of the periphery of one's vehicle, there are a method using map information about a car navigation system, a method for estimating a likely road shape by probabilistically estimating the degree of conformance to plural road models previously prepared for a camera image in which the front of one's vehicle is photographed, a method for obtaining information about a road shape from a roadside system using road-to-vehicle communication, a method for estimating a road shape in one's vehicle by obtaining an image of a fixed-point camera set at an intersection using a road-to-vehicle communication system, etc. Also, as a method in which the traffic obstacle detection portion 101 detects a pedestrian, a vehicle, a crosswalk and a traffic signal of the periphery of one's vehicle, a method for probabilistically estimating the degree of conformance to plural templates previously prepared for each of the pedestrian, the vehicle, the crosswalk and the traffic signal, and a camera image in which the front of one's vehicle is photographed is given. Further, as a method in which the traffic obstacle detection portion 101 detects a crosswalk or a traffic signal, a method using map information about a car navigation system or a method for obtaining a lighting situation state of the traffic signal or a presence place from a roadside system through road-to-vehicle communication is given. For a vehicle and a pedestrian, each of the vehicle and the pedestrian mounts and carries a terminal having a sensing unit for detecting acceleration, an input unit for inputting one's own attributes (age, sex, belonging information, etc.) and a communication unit for communicating with other person and the respective attributes or states are sent from the terminal to one's vehicle using the communication unit and thereby, the traffic obstacle detection portion 101 can detect the vehicle and the pedestrian. The belonging information herein is information indicating belonging of a pedestrian or a driver of a vehicle mounting or carrying the terminal, and is, for example, information capable of being used for identifying a pedestrian having a terminal with a terminal unique ID of A and a pedestrian having a terminal with a terminal unique ID of B as a parent and a child. Also, a mobile telephone etc. could be used as a terminal carried by a pedestrian.

Figure 3:
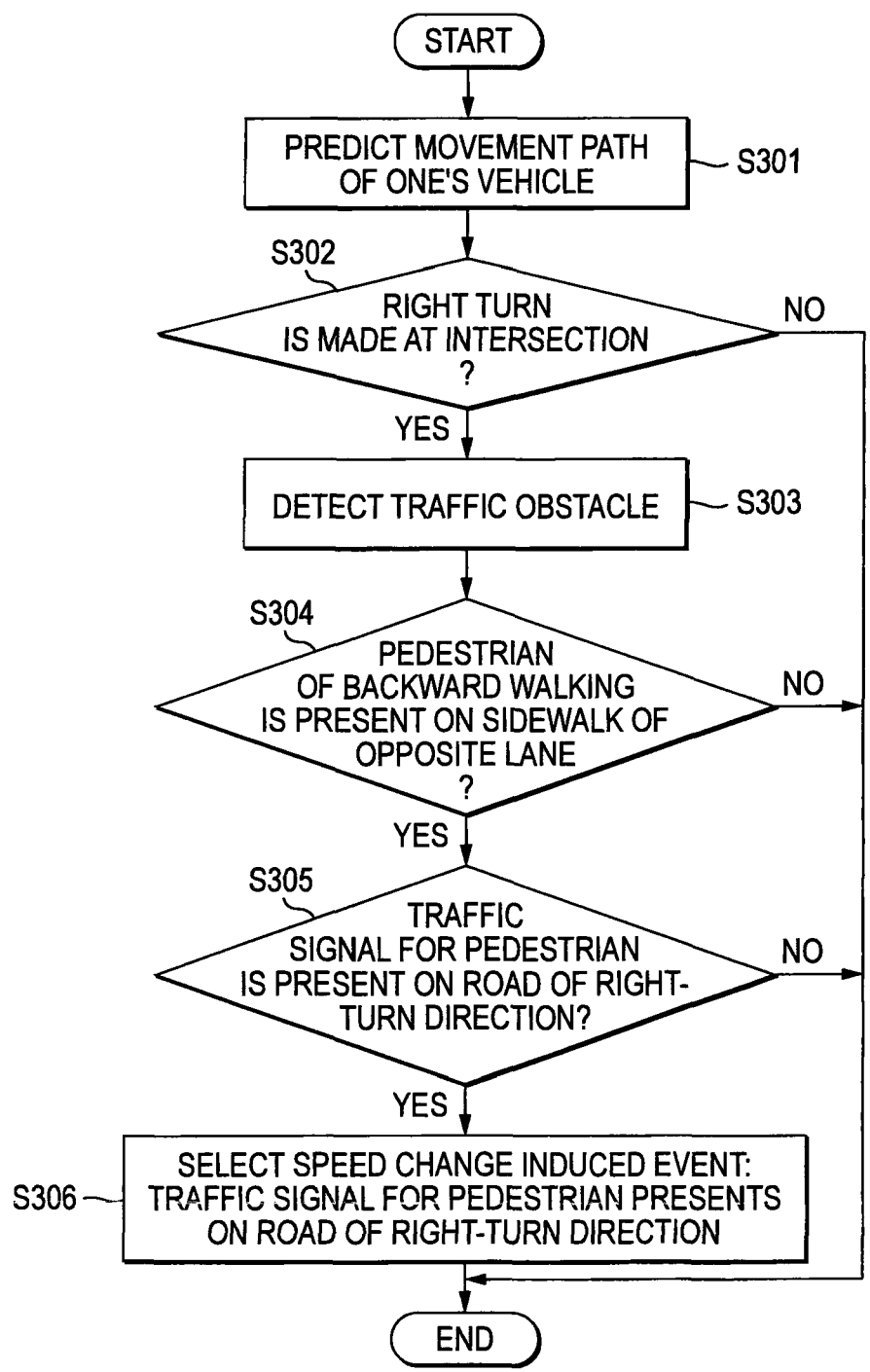
FIG. 3 is a flow diagram representing an operation of a step of selecting a speed change induced event.

Here, FIG. 3 shows an operation flow of step S201 of the case where the point of a change in a signal for pedestrian installed on a road of the right-turn direction becomes a speed change induced event. In step S201, the one's vehicle movement path prediction portion 104 predicts the near future movement path of one's vehicle from travel information about one's vehicle (S301).

A method for predicting a movement path of one's vehicle includes a method using route information to a destination set in a car navigation system, a method for predicting a movement path at an intersection which a driver enters in the near future from winker indication of one's vehicle and a road shape detected by the traffic obstacle detection portion 101, a method for estimation using a driving behavior prediction model created based on statistical learning from the subsequent advance direction of one's vehicle and time series data of manipulations etc. of winker, steering, accelerator or brake of a driver, etc. The movement path of one's vehicle may be predicted by these methods. In the case of detecting that a right turn is made at the intersection which a driver enters next (S302: Yes), the speed change induced event selection portion 105 detects a traffic obstacle of the periphery of one's vehicle using the traffic obstacle detection portion 101 (S303).

Here, a detection range in which the speed change induced event selection portion 105 detects a traffic obstacle using the traffic obstacle detection portion 101 could be set in a region including a sidewalk and a roadway including an opposite lane of a path of one's vehicle predicted and a traffic regulation substance such as a traffic signal or a sign present over them. For example, in the case of detecting that the right turn is made at the intersection, a detection range of a horizontal direction with respect to a road surface could be set in a range in which all of the inside of the intersection, a sidewalk and a roadway of an opposite lane and one's lane are included as a region before entering the intersection and a sidewalk and a roadway of an opposite lane and one's lane are included as a region of a road of the right-turn direction and a detection range of a vertical direction could be set in a range in which a traffic regulation substance such as a traffic signal, marking or a sign present over them is included.

Limiting the detection range of the traffic obstacle thus is also effective in limiting a range of sensing the traffic obstacle of the periphery of one's vehicle and reducing a processing load of the traffic obstacle detection portion 101.

The traffic obstacle detection portion 101 detects a movement state, a position of a moving object of the periphery of one's vehicle, the presence or absence of a traffic signal, a road shape of the front of one's vehicle from the detection range determined thus, with the result that when a pedestrian of backward passage is present on a sidewalk of an opposite lane (S304: Yes) and a traffic signal for pedestrian is present on a road of the right-turn direction (S305: Yes), the speed change induced event selection portion 105 selects "the point of a change in the signal for pedestrian installed on the road of the right-turn direction" as a speed change induced event to be detected (S306). Here, the example of selecting only one speed change induced event is shown, but plural speed change induced events may be selected naturally.

When the speed change induced event is selected, the visual recognition determination portion 108 makes a visual recognition determination by a visual check of a driver to a dangerous pedestrian candidate defined according to the speed change induced event (S202). The dangerous pedestrian candidate refers to a pedestrian having a possibility of becoming a dangerous pedestrian when the speed change induced event occurs, and is a pedestrian to perform safety confirmation by a driver for safety driving.

The visual recognition determination portion 108 could decide that a visual check is made in the case of gazing at the dangerous pedestrian candidate, for example, for 0.5 second or more continuously based on a definition about gaze time of, for example, ISO 15007.

Figure 4:
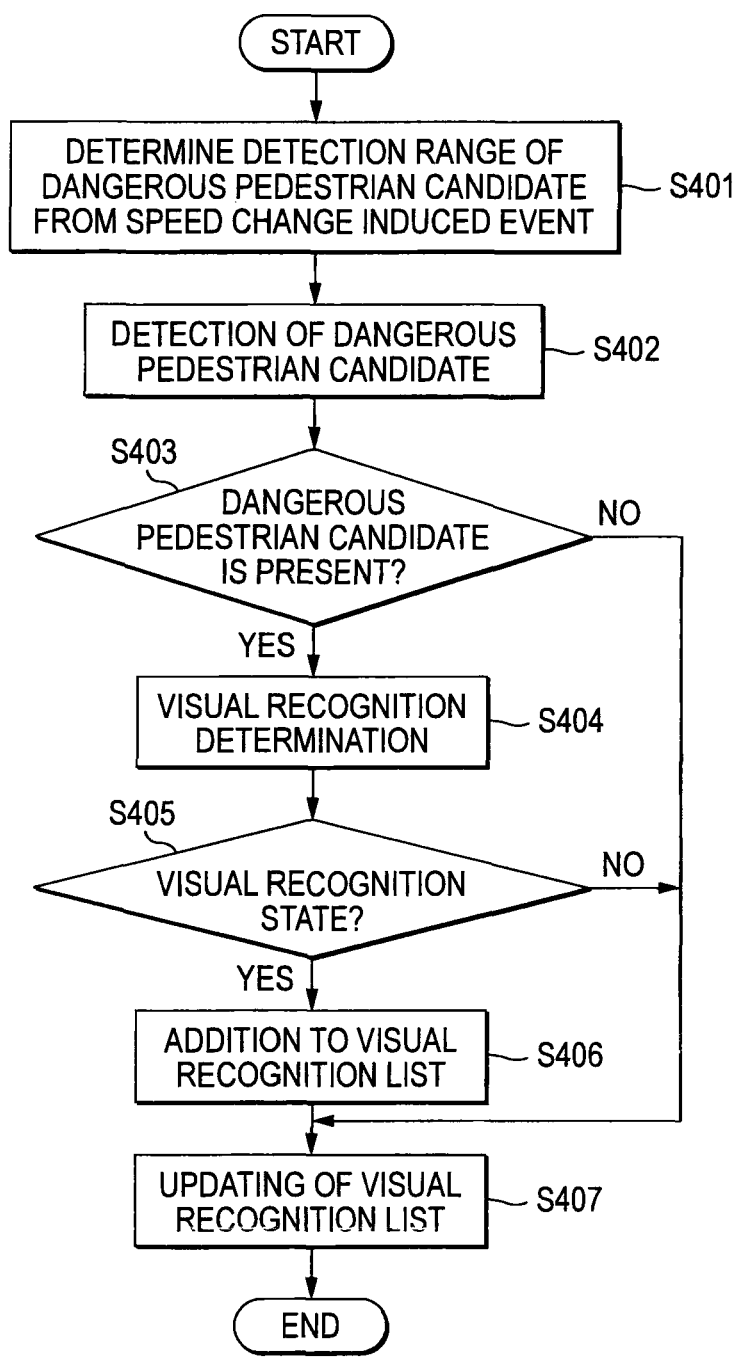
FIG. 4 is a flow diagram representing an operation of a step of making a visual recognition determination to a dangerous pedestrian candidate.

Here, FIG. 4 shows an operation flow of step S202 of making a visual recognition determination to a dangerous pedestrian candidate. In step 202, according to the speed change induced event selected in the step (S201) of selecting the speed change induced event, the speed change induced event selection portion 105 sets a detection range of the dangerous pedestrian candidate on a sidewalk of an opposite lane before and after an intersection which one's vehicle is about to enter (S401), and detects the dangerous pedestrian candidate from the detection range using the traffic obstacle detection portion 101, and identifies a direction of presence (S402).

When the dangerous pedestrian candidate is present (S403: Yes), the visual recognition determination portion 108 determines that it is recognized by a visual check (in a state of visual recognition) when a difference between a sight line direction of a driver and a presence direction of the dangerous pedestrian candidate is smaller than a certain angle (for example, 5 degree or less) (S404).

When the visual recognition state is detected (S405: Yes), a visual recognition object recognized by a driver at that point in time is added to a visual recognition list as the visual recognition object visually recognized by the driver (S406). The visual recognition list has a queue structure of FIFO (First-In First-Out), and is updated so that only the visual recognition object in which time at which a visual recognition object is visually recognized finally is within, for example, 10 seconds is retained in the visual recognition list (S407).

When plural recognition object pedestrians are present, a visual recognition state of each and every pedestrian may be determined or the pedestrians with a short mutual distance may be grasped as a group to set the group as a visual recognition object.

In addition, limiting a presence range of a dangerous pedestrian candidate based on a speed change induced event selected by the speed change induced event selection portion 105 is also effective in limiting a range of sensing a pedestrian and reducing a processing load of the traffic obstacle detection portion 101.

The speed change induced event detection portion 106 detects whether "the point of a change in a signal for pedestrian installed on a road of the right-turn direction" which is the speed change induced event selected by the speed change induced event selection portion 105 occurs from a lighting situation of a signal for pedestrian of the signal detected by the traffic obstacle detection portion 101 (S203).

When the point of the change in the signal for pedestrian is not detected (S204: No), processing is repeated from S201. On the other hand, when the point of the change in the signal for pedestrian is detected (S204: Yes), a change in speed of a dangerous pedestrian candidate defined in step S202 is detected by the speed change detection portion 102 (S205).

When the change in speed of the dangerous pedestrian candidate is not detected within a certain time (for example, 2 seconds) from occurrence of the speed change induced event (S206: No), processing is repeated from S201. When the change in speed of the dangerous pedestrian candidate is detected within the certain time (S206: Yes), it is decided that the detected change in speed of the dangerous pedestrian candidate is unexpected behavior for a driver, and the information providing portion 110 calls attention (S207).

In an example shown in FIG. 5, a start of blinking of a traffic signal for pedestrian is first detected at time t (S203, S204). Then, from a position of a pedestrian at time (t−1), a position of the pedestrian at time t and a position of the pedestrian at time (t+1), a speed of the pedestrian between time (t−1) and time t and a speed of the pedestrian between time t and time (t+1) are detected and a change in speed of the pedestrian is detected at time (t+1) (S205, S206). Therefore, it is decided that it is unexpected behavior for a driver, and attention is called to the driver after time (t+1) (S207).

In addition, the example of calling attention to a driver by the information providing portion 110 in the case of detecting a change in speed of a dangerous pedestrian candidate is shown herein, but a headlight of one's vehicle may be applied in a direction of the dangerous pedestrian candidate or one's vehicle may be braked automatically by the vehicle control portion 111.

Figure 6:
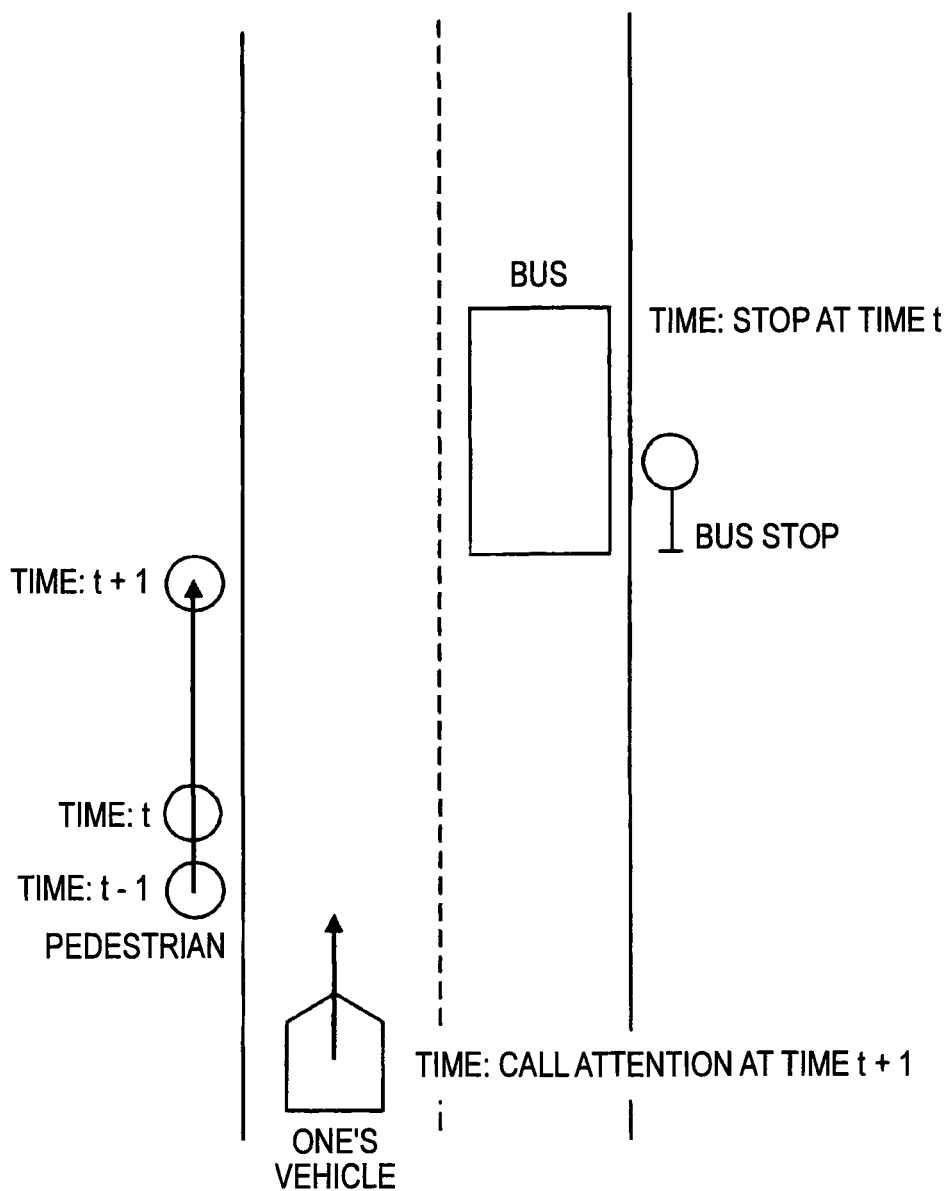
FIG. 6 is a diagram representing a situation of a pedestrian who suddenly accelerates and crosses a road at the time when a bus stops at a bus stop.

Also, the first embodiment can be applied to examples other than the example described above. For example, as shown in FIG. 6, it can also be applied to the case where a pedestrian who is backward traveling on a sidewalk of a lane of the one's vehicle side suddenly changes a direction and crosses a road when a route bus stops at a bus stop of an opposite lane while one's vehicle travels on a single road.

In this case, the case where a bus stop is present in a lane opposite to a road on which one's vehicle travels in the near future and a pedestrian is present on a sidewalk of a lane of the one's vehicle side could be selected as a speed change induced event. Also, a stop of a route bus at a bus stop or approach to a bus stop within a certain distance could be selected as the speed change induced event. A detection range of a dangerous pedestrian candidate could be set in a sidewalk of a lane of the one's vehicle side.

As a method for detecting a bus stop, a method using map information about a car navigation system, a method for detecting a likely bus stop by probabilistically estimating the degree of conformance to each of the plural bus stop templates previously prepared every bus stop and a camera image in which the front of one's vehicle is photographed, a method for obtaining information about the bus stop from a roadside system using road-to-vehicle communication such as a radio beacon, an optical beacon or DSRC, etc. are considered.

As a method for detecting a route bus, a method for probabilistically estimating the degree of conformance to each of the plural templates previously prepared for the route bus every bus and a camera image in which the front of one's vehicle is photographed is given. Further, the route bus may be detected by sending a state (speed, acceleration, etc.) of the route bus to one's vehicle using communication means mounted in the route bus.

Figure 7:
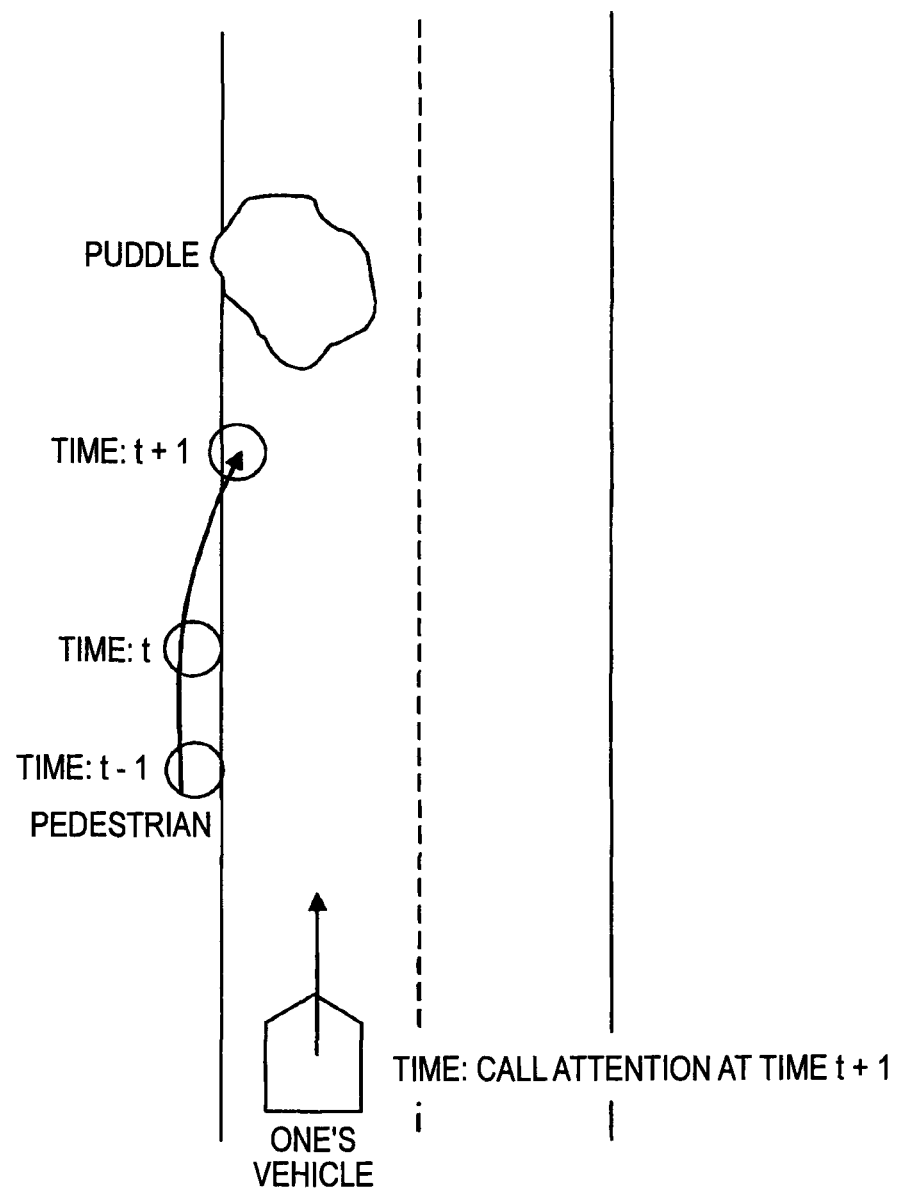
FIG. 7 is a diagram representing a situation of a pedestrian who avoids a puddle or a construction are and suddenly enters a road.

Moreover, for example, as shown in FIG. 7, it can also be applied to the case where a pedestrian who is backward traveling on a sidewalk of a lane of the one's vehicle side suddenly enters a path of one's vehicle in order to avoid a puddle or a construction area when the puddle or the construction area is present on a sidewalk or a lane of the one's vehicle side.

As a method for detecting a puddle, determination can be made by detecting a polarization region on a sidewalk or a roadway in a camera image in which the front of one's vehicle is photographed. As a method for detecting a construction area, a method for obtaining traffic information such as VICS from a radio beacon, an optical beacon, DSRC, etc. or a method for detecting a sign etc. under road construction present in the front of the construction area by a camera image etc. is given.

In this case, the case where a puddle or a construction area is present on a sidewalk or a lane of the one's vehicle side and a pedestrian is present on a sidewalk of the lane of the one's vehicle side could be selected as a speed change induced event. Also, the case where a pedestrian approaches a puddle or a construction area within a certain distance (for example, 5 m or less) could be selected as the speed change induced event. A detection range of a dangerous pedestrian candidate could be set in a sidewalk of a lane of the one's vehicle side.

Figure 8:
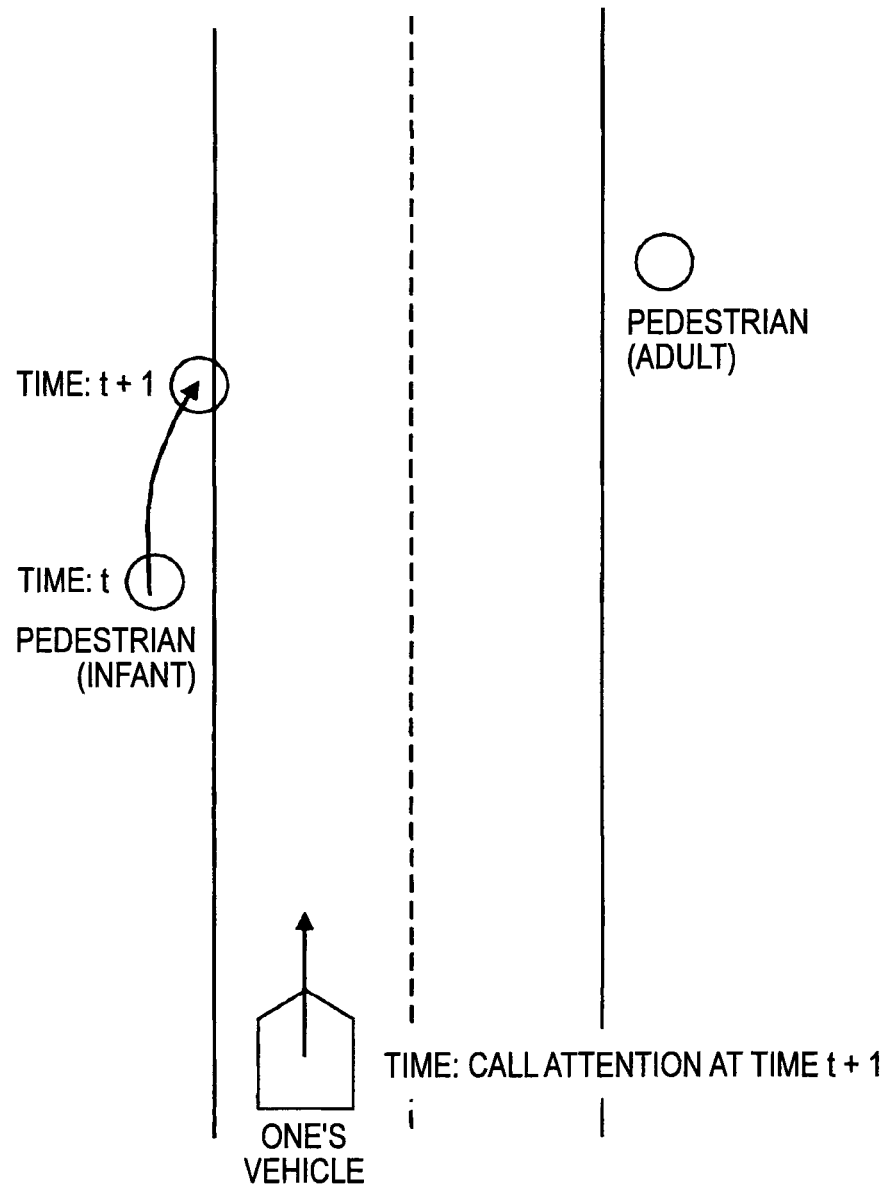
FIG. 8 is a diagram representing a situation in which an infant suddenly starts to move toward an adult on a pedestrian of an opposite lane.

Moreover, for example, as shown in FIG. 8, it can also be applied to the case where an infant suddenly starts to move and enters a path of one's vehicle from a situation in which one infant stops on a sidewalk of a lane of the one's vehicle side and an adult stops on a sidewalk of the opposite lane and faces each other.

In this case, the case where one infant is present on a sidewalk of a lane of the one's vehicle side (an adult is not present within 3 m around the infant) and an adult is present on a sidewalk of the opposite lane could be selected as a speed change induced event. Also, a state in which an adult and an infant face each other across a road on which one's vehicle is traveling could be selected as the speed change induced event. A detection range of a dangerous pedestrian candidate could be set in a sidewalk of a lane of the one's vehicle side.

Figure 9:
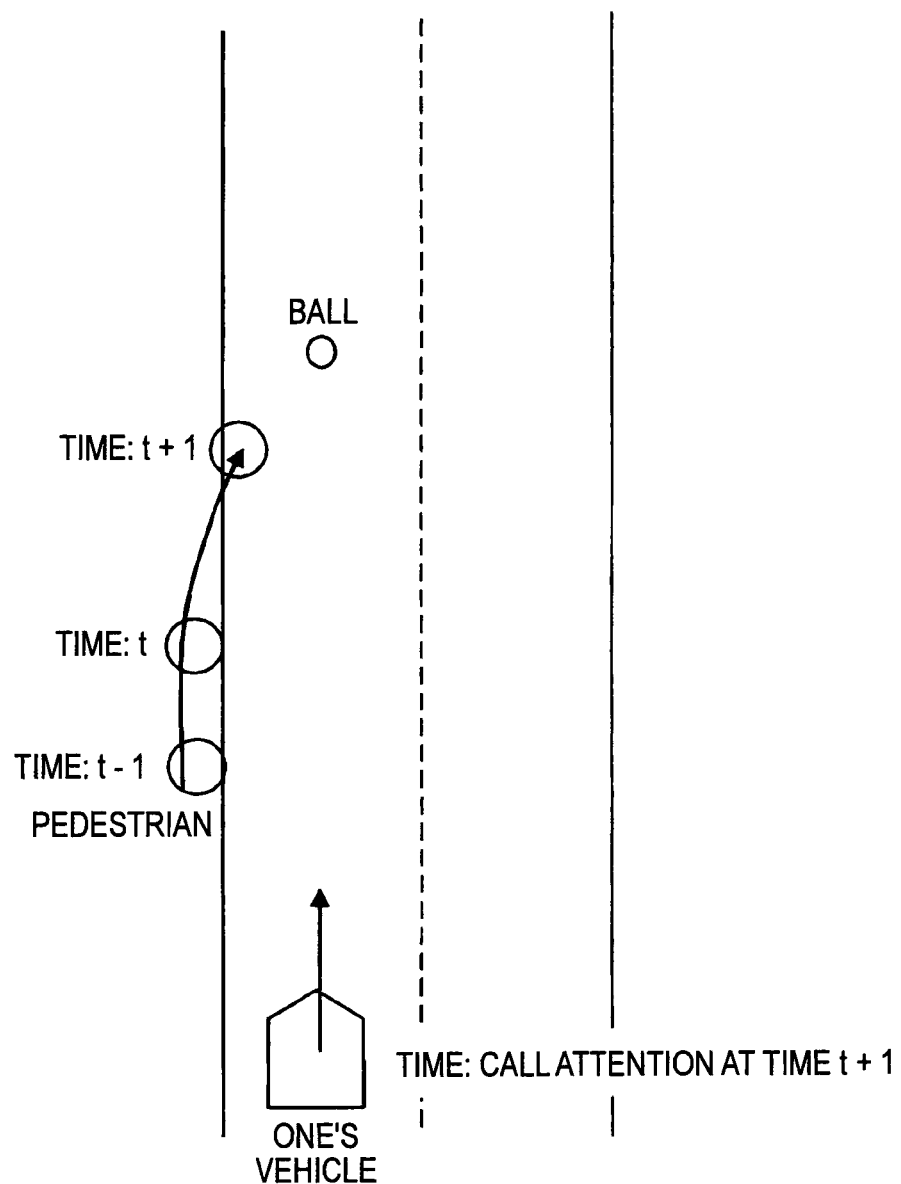
FIG. 9 is a diagram representing a situation in which a child follows a ball and suddenly enters a road.

Moreover, for example, as shown in FIG. 9, it can also be applied to the case where when a ball is detected on a path of one's vehicle, a child follows its ball and suddenly enters the path of one's vehicle. In this case, the case where a ball and a child are present on a sidewalk of a lane of the one's vehicle side (a distance between the ball and the child is, for example, 5 m or less) could be selected as a speed change induced event. Also, a state in which a ball enters a path of one's vehicle could be selected as the speed change induced event. A detection range of a dangerous pedestrian candidate could be set in a sidewalk of a lane of the one's vehicle side.

As a method for detecting a ball on a path of one's vehicle, an object with a circle of a predetermined size (for example, 5 cm or more in diameter) in a camera image in which the front of one's vehicle is photographed could be detected.

According to the embodiment of the invention as described above, a dangerous moving object with a high possibility of leading to an accident since a speed is suddenly changed against driver's expectation, for example, a pedestrian who suddenly starts to run when a signal changes from blue to red at an intersection can be detected with high accuracy. Also, for example, the dangerous moving object can be detected at timing quicker than the conventional case of detecting that a pedestrian enters a path of one's vehicle. Therefore, a driver can properly grasp presence of the dangerous moving object to be particularly noted according to a situation of the periphery of one's vehicle, so that occurrence of an accident can be prevented.

Also, by limiting a presence range of a moving object targeted for detection, for example, detection processing can be performed with respect to only an object to be alarmed even in a situation in which multiple dangerous pedestrian candidates are present, so that a processing load of a traffic obstacle detection portion can be reduced.

The invention has been described in detail with reference to the specific embodiment, but it is apparent to those skilled in the art that various changes or modifications can be made without departing from the spirit and scope of the invention.

The present application is based on Japanese patent application (patent application No. 2007-096609) filed on Apr. 2, 2007, and the contents of the patent application are hereby incorporated by reference.

Industrial Applicability

The invention is useful as a safety driving support apparatus, a car navigation system, etc. for detecting that a pedestrian causes a change in behavior against driver's expectation and calling attention to the driver.

The invention claimed is:

1. A safety driving support apparatus, comprising:
   a traffic obstacle detection section that detects a moving object including a vehicle other than one's vehicle or a pedestrian present in a periphery of one's vehicle, the moving object and a traffic regulation substance, or the moving object and a road shape, and detects a position or a movement state of the moving object when the traffic obstacle detection section detects the moving object;
   a speed change induced event selection section that selects a speed change induced event which is defined as an event in relation to a first moving object or the traffic regulation substance and of inducing a change in speed of a second moving object on the basis of a detection result in the traffic obstacle detection section when the traffic obstacle detection section detects at least one of the first moving object, the traffic regulation substance and the road shape and further detects the second moving object;
   a speed change induced event detection section that determines a presence or absence of occurrence of the selected speed change induced event;
   a speed change detection section that determines a presence or absence of occurrence of the change in speed of the second moving object when the traffic obstacle detection section detects the occurrence of the selected speed change induced event; and
   a dangerous moving object detection section that determines the second moving object as a dangerous moving object when the speed change induced event detection section detects the change in speed of the second moving object.

2. The safety driving support apparatus according to claim 1, further comprising:
   a one's vehicle movement path prediction section that predicts a path of one's vehicle,
   wherein the speed change induced event selection section selects the speed change induced event within a range determined on the basis of a path of one's vehicle predicted by the one's vehicle movement path prediction section.

3. The safety driving support apparatus according to claim 2, further comprising:
   a one's vehicle travel information detection section that detects travel information about one's vehicle,
   wherein the one's vehicle movement path prediction section predicts the path of one's vehicle on the basis of the travel information about one's vehicle detected by the one's vehicle travel information detection section.

4. The safety driving support apparatus according to claim 1, wherein the traffic obstacle detection section further detects a position or a shape feature of the moving object when the traffic obstacle detection section detects the moving object, a position or a shape feature of the traffic regulation substance when the traffic obstacle detection section detects the traffic regulation substance, and a position or a shape feature of the road shape when the traffic obstacle detection section detects the road shape.

5. The safety driving support apparatus according to claim 4, further comprising:
   a sight line detection section that detects a sight line direction of a driver of one's vehicle; and
   a visual recognition determination section that determines whether or not the driver visually recognizes the second moving object on the basis of position information of the moving object detected by the traffic obstacle detection section and the sight line direction detected by the sight line detection section,
   wherein the dangerous moving object detection section determines the second moving object as the dangerous moving object when the visual recognition determination section determines that the driver visually recognizes the second moving object within a past predetermined time.

6. The safety driving support apparatus according to claim 5, further comprising a storage section that stores information indicating the speed change induced event in relation to information about the traffic regulation substance, the road shape or the moving object,
   wherein the speed change induced event selection section selects the speed change induced event to be detected by the speed change induced event detection section from the information stored in the storage section.

7. The safety driving support apparatus according to claim 1, further comprising:
   an acquisition section that acquires information indicating the speed change induced event from a roadside system installed in a road through a road-to-vehicle communication section,
   wherein the speed change induced event selection section selects the speed change induced event to be detected by the speed change induced event detection section from the information acquired by the acquisition section.

8. The safety driving support apparatus according to claim 1, further comprising:
   a information providing section that provides information about avoidance of contact with the dangerous moving object to a driver when the dangerous moving object is detected by the dangerous moving object detection section.

9. The safety driving support apparatus according to claim 1, further comprising:
   a vehicle control section that controls a vehicle for avoidance of contact with the dangerous moving object when the dangerous moving object is detected by the dangerous moving object detection section.

* * * * *